United States Patent [19]

Reid-Green et al.

[11] Patent Number: 5,001,769

[45] Date of Patent: Mar. 19, 1991

[54] IMAGE PROCESSING SYSTEM

[75] Inventors: Keith S. Reid-Green, Pennington; David R. Bostain, Princeton, both of N.J.; Jeffrey M. Charlesworth, Doylestown, Pa.; Dennis Quardt, Parsippany, N.J.; Joan Z. Rojo, Bensalem, Pa.; Christopher Wynings, Cranbury, N.J.

[73] Assignee: Educational Testing Service, N.J.

[21] Appl. No.: 287,483

[22] Filed: Dec. 20, 1988

[51] Int. Cl.$^5$ ............................................. G06K 9/00
[52] U.S. Cl. ......................................... 382/61; 382/48; 358/452; 358/450; 358/462
[58] Field of Search ................... 382/61, 48; 358/452, 358/450

[56] References Cited

U.S. PATENT DOCUMENTS

| | | | |
|---|---|---|---|
| 4,021,777 | 5/1977 | Shepard | 382/61 |
| 4,493,108 | 1/1985 | Fryer et al. | 382/61 |
| 4,677,551 | 1/1987 | Suganuma | 382/61 |
| 4,758,980 | 7/1988 | Tsunekawa et al. | 382/61 |

Primary Examiner—Leo H. Boudreau
Assistant Examiner—Daniel Santos

[57] ABSTRACT

A method and apparatus for processing forms and organizing data taken from the forms, including optical scanning of a sheet and obtaining image data from selected portions of the sheet, and formatting of the selected image data and storing and displaying the formatted image data or subsequent use.

13 Claims, 7 Drawing Sheets

|x73| |08| |0770|

|2| |20|

|Boman| |James| |T.|

|07| |18| |67|

|226-1/2 W. 7th St., Apt. #4C|

|218| |EX8| |2499|

|Glenwood| |ME| |18777| xx| xx| |2|

|71143| |1603|

|9|

| 7| 61|         |   |   |  |8|          | 6000  |                    |      |
|---------------|---|---|-------------|-------|--------------------|------|
|               |   |   | 31872.00    |   0   | Taylor Univ.       | 1202 |
| II            |   |   | 27000.00    |   0   | Temple Univ.       | 1816 |
|               |   |   |   201.00    |   0   | Tampa Coll.        | 0907 |
| 4210          | $3007.00 |   |    30.00    |       | Indiana Unv.       | 1286 |
|               | $   0.00 |  |  2000.00    |  50   | Bida Univ          | 4017 |
| 210           | $   0.00 |  |     0.00    | 17500 | Brainerd Coll      | 5047 |
|   0           |          |   |  6520.00    |  |8|8| | Calvin Coll        | 1095 |
| 4011          | $2743.00 |  |  2000.00    |  |89| | Dickinson          | 6777 |
|   0           | $   0.00 |  |  8000       |   0   |                    |      |
|   0           | $   0.00 |  | 17914       |       |                    |      |
|   0           | $   0.00 |  | 10007       |       |     |0 0|          |      |
|   0           | $1665.00 |  |             | 2500  |                    |      |
|   0           | $   -.00 |  |     0       |       |                    |      |
|               | $   0.00 |  |     0       |       |                    |      |
| 710           | $   0.00 |  |     -       |       |                    |      |
|   0           |          |   |   750       |       |                    |      |
|               |   |7|     |             |       |                    |      |
| 576           |          |   |             |       |                    |      |
|               |   |1| |1|  |  8000       |       |                    |      |
|               |          |   | -11000      | |10| |17|              |      |
|               |   |1|     |     -       |       |                    |      |
|               |  |1|      |     -       |       |                    |      |
| -0-           |  |1|      |  ------     |       |                    |      |
|               |  |2|      |   -500      |       |                    |      |
|               |  |2|      |  34000      |       |     |✓|714|        |      |
| -0-           |          |   |     0       |       |                    |      |
|               |          |   |  4700       |       |                    |      |
| -0-           |          |   |     0       |       | xxxxxxxxx          |      |
|   -           |          |   |             |       | 1 James Bowman     |      |
|               |          |   |             |       | 3 Mr. and Mrs. Tom Bowman | |

"REG commands"

```
reg regl  up       up
   0    0[   21,  37,  24,  24]  200 320 4.0 6.0 4.0 6.0 -.5 .5
1678    0[ 1608,  37,  24,  24]  200 320 4.0 6.0 4.0 6.0 -.5 .5
1678 9999[ 1610,1190,  24,  24]  200 320 4.0 6.0 4.0 6.0 -.5 .5
   0 9999[   21,1190,  24,  24]  200 320 4.0 6.0 4.0 6.0 -.5 .5
```

"COPY commands contained within buffer pg1, page 1."

```
"                                                                                           "
"         INPUT_BUF    XTOP YTOP WDTH HGHT REGBUF  OUTPT_BUF  XTOP YTOP  ERROR"
"                                                                                           "
cpy y (  up [  16,  58,  59, 248] reg1} { kedoc1 (  18,1005)}} standard
cpy y (  up [  16, 306,  59, 188] reg1} { kedoc1 (  18, 811)}} standard
cpy y (  up [1574, 206,  58, 168] reg1} { kedoc1 ( 785, 457)}} standard
cpy y (  up [1503, 206,  59, 168] reg1} { kedoc1 ( 720, 454)}} standard
cpy y (  up [1422, 206,  58, 168] reg1} { kedoc1 ( 886, 875)}} standard
```

*Fig. 5C*

"OMR commands contained within buffer pg1, page 1."

```
"                                                                                                              "
"         INPUT_BUF   XTOP YTOP              OFF  LEN  LO  HI TYPE  ERROR"
"                                                                                                              "
omr y (  up [1308, 118, 21, 20] reg1} {wip $ 278$  6)  20 100 count std
omr y (  up [ 895, 124, 21, 20] reg1} {wip $ 236$  6)  20 100 count std
omr y (  up [ 496, 124, 20, 20] reg1} {wip $ 212$  6)  20 100 count std
omr y (  up [ 853, 124, 21, 20] reg1} {wip $ 224$  6)  20 100 count std
omr y (  up [ 447, 124, 20, 20] reg1} {wip $ 200$  6)  20 100 count std
omr y (  up [ 575, 966, 20, 20] reg1} {wip $ 122$  6)  20 100 count std
omr y (  up [ 432, 956, 21, 20] reg1} {wip $ 104$  6)  20 100 count std
omr y (  up [ 721, 860, 21, 20] reg1} {wip $ 140$  6)  20 100 count std
omr y (  up [ 867, 969, 20, 20] reg1} {wip $ 188$  6)  20 100 count std
```

*Fig. 5D*

IMAGE PROCESSING SYSTEM

BACKGROUND OF THE INVENTION

The present invention relates to an image processing system for processing printed forms containing information recorded thereon by a person, and more particularly to an improved image processing system for scanning forms and processing data from predetermined fields of each forms.

In conventional form scanning, the form which contains marked information, e.g., areas that have been filled in or left blanked, or checked, etc., is fed into a scanning device which generates digital data representative of a video image of the form. The derived electronic information, in the form of digital bits of data, is transferred to a computer or other suitable processing means, where the data corresponding to the predetermined fields is processed to derive the information content the user has marked down in those fields. The form is presumed to be properly positioned in the scanner so that the locations of areas or fields, where marks are to be located, are known to the computer. Thus, the computer is informed in advance of the coordinates of predetermined fields of data on a form, and applies that information directly to the video image data to locate those predetermined fields where information is to be found.

Such prior art systems are limited in their accuracy due to the operating premise that the document is properly oriented in the scanner. This premise poses no problem where the applicable tolerances are fairly large, such that a fair degree of skew or misalignment of the scanned form can be accommodated. However, the greater the amount of data on the form, the greater the required precision of identifying the predetermined fields that contain that data, and the less reliable are the systems which make no allowance for imprecise positioning of the form with respect to the scanner.

Other problems exist regarding applications where extremely large numbers of forms must be scanned and processed, and where time and operating expense are very significant. For example, where a multi-page form contains data that is distributed throughout, some of which cannot be automatically processed, there is a great need to reduce the operator time required to find the data and manually enter it into the system. Frequently multi-page forms are designed from the viewpoint of being clear to the persons who will fill them in, and not from the viewpoint of optimizing retrieval of the data. Thus, considerable delay may be caused by the time it takes an operator to locate the desired fields of information, so as to be able to identify the data, encode it, and enter it properly into storage. To the extent that such data can be identified automatically and represented to the operator in a more organized format, operator time can be reduced significantly. Further, such organization of data is helpful in achieving the ultimate objective of complete automated processing of all data derived from the form, which would eliminate any need for operator entry of data prior to processing.

Another need that has arisen in data gathering applications involving scanners is to record images of selected written answers, e.g., printed on sheets or stored on optical discs, or both. Since storage is expensive, whatever the storage medium, there is a need to select and format certain images for display and storage, while avoiding the requirement of storing the entire form.

There is thus a significant need in the art for a system and a method for processing scanned form data so as to identify predetermined fields of data, generating image data corresponding to just such specified fields of data for processing, and providing improved formatting of such specified data for storage and/or processing.

SUMMARY OF THE INVENTION

It is an object of the invention to provide an improved method, and system for carrying out such method, for scanning documents having data marked thereon by a user, and processing such data in a way that minimizes system and operator time, while providing an improved format of selected scanned data in a form suitable for display and storage.

It is another object of this invention to provide an improved system and method for processing video image data representative of scanned forms, wherein reliability of determining and segregating specified field data is increased while reducing system and operator time involved.

In accordance with the above objects, there is provided a system, and method carried out by such system, for processing forms to obtain data therefrom and to organize such data in a formatted manner that reduces system time and provides a greater through-put. Form file data corresponding to a predetermined form is stored and used for generating process commands corresponding to each of a plurality of predetermined specified fields on the form where data is to be entered by the user. The form is scanned by a scanner which is controlled by a computer. The scanned data is registered so as to enable exact determination of data corresponding to predetermined fields following which only such predetermined field data is processed. The computer operates on the selected field data with respective process commands corresponding to the form file data, the computer processing including formatting selected field data. The formatted data is outputted to provide formatted images of the selected fields. In a preferred embodiment some of the data is stored on an optical disc so as to provide for subsequent printout of formatted images representing the original fields as filled out by the user. In another embodiment selected portions of the data are automatically processed to obtain numerical data therefrom, and reports are automatically derived from such data.

DESCRIPTION OF THE PREFERRED EMBODIMENTS

Figure 1A:
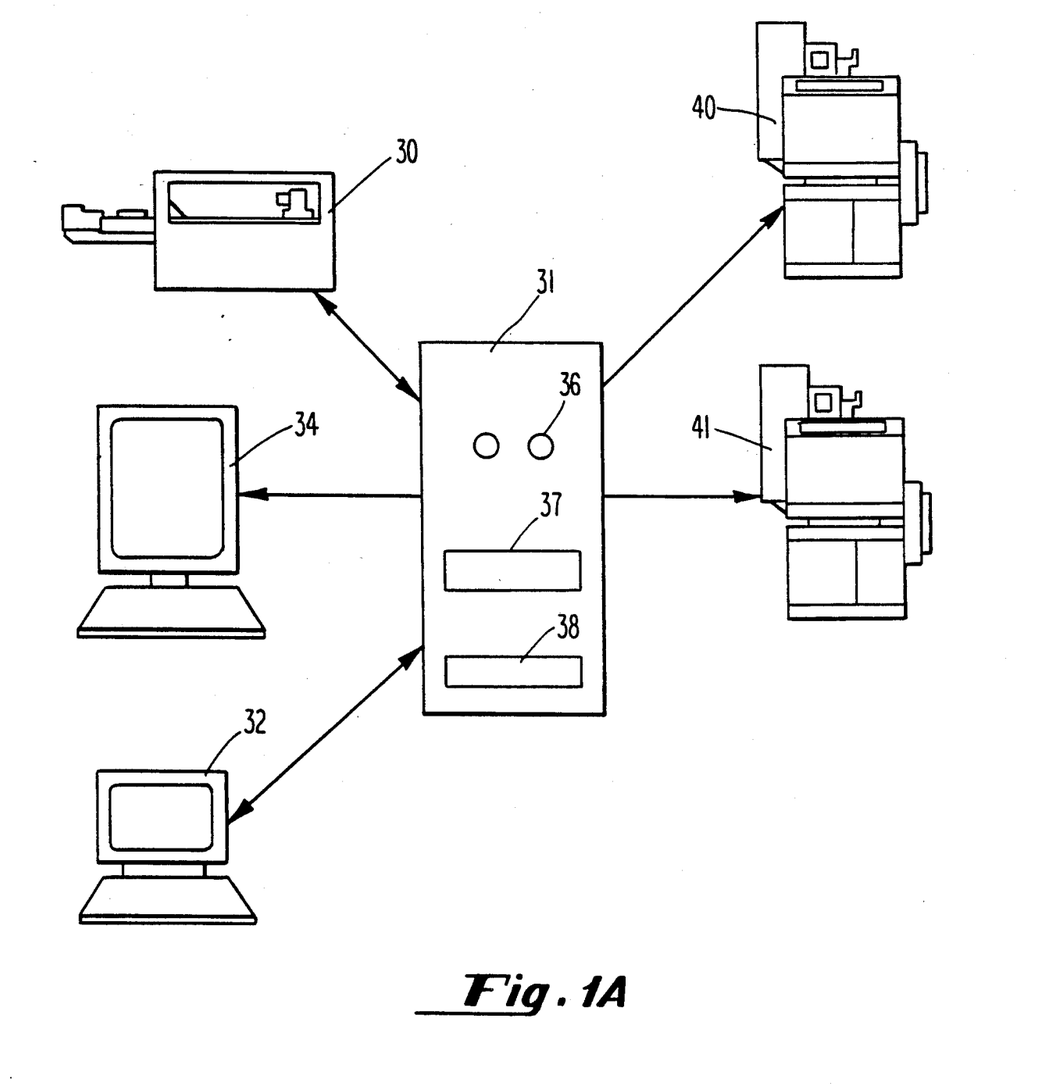
FIG. 1A is a block diagram of a first portion of the hardware of a preferred embodiment of the invention.

Referring now to FIG. 1, there is shown a block diagram of a preferred system as used in carrying out a method of this invention. The system is designed for processing of forms of the type such as the Financial Aid Form (FAF) produced by Educational Testing Services, the assignee of this invention. The FAF is printed on both sides of an 11×17 inch sheet, and comprises four 8½×11 inch pages when folded. For the following description of the system, it is presumed that data concerning the makeup of the form, and in particular the coordinate locations of regions, or fields where different items of information are placed, is in a digital form and is stored in the system. Examples of the manner in which such form file information is stored in the system are presented in FIGS. 5A and 5B, as discussed in more detail hereinbelow.

A pile of forms are inputted to a paper document scanner, or form scanner 30. Suitably scanner 30 may be a Terminal Data Corp. 4140 unit having optics and electronics provided by Photomatrix Corp. While the specific electronic and optical design of the scanner is not regarded as a part of this invention, this particular scanner has the requisite characteristics for use in the system of this invention. The forms are transported through the scanner in an open condition, such that both sides of the full 11×17 sheet are available for scanning. The scanner 30 is connected to and interfaces a computer 31, for example, a Sun Microsystems computer 3/280. Computer 31 sends control commands to the scanner 30 to control the transmission of scanned image data from the scanner 30 to the computer. The computer 31 also contains processing capability for processing the received scanned data in accordance with predetermined process commands, as discussed more fully hereinbelow. The computer is in communication with an operator console 32, suitably a Digital Equipment Corporation VT-320. It is also in communication with a high resolution monitor 34 suitably made by Gould Electronics Corp.

Figure 4:
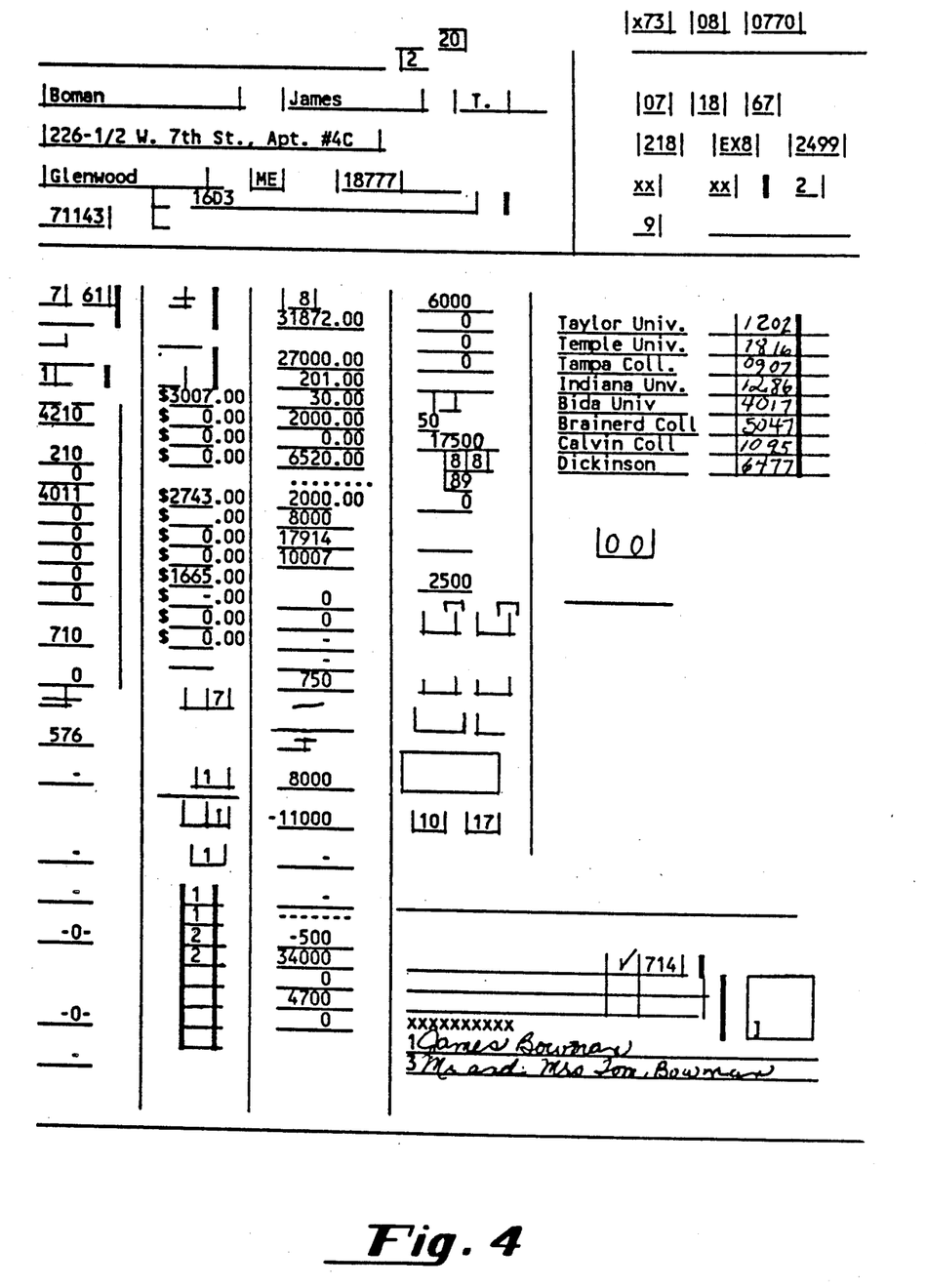
FIG. 4 is an illustration of a document containing formatted images of specified fields from a plurality of scanned form pages.

In the preferred embodiment, the computer 31 has several forms of data storage associated with it. A magnetic tape unit 36, of conventional structure, is used for storing selected field data. As represented in FIG. 1., the computer is also connected to an image printer 40, for printing out images of the selected data stored on the magnetic tape. For example, in one embodiment of the invention, selected field data which is not automatically processed is image-printed by a printer 40 in the form of a key entry document, which key entry document is utilized by an operator for inputting digital data into the system in a form ready for processing. FIG. 4 is a representation of such a key entry document. Printer 40 is suitably one manufactured by Delphax, Inc. The computer 31 also preferably has associated with it an optical disc system 37, such as the type made by Laser Magnetic Storage International. It may also suitably have a magnetic disc of the form made by Sun Microsystems. The preferred embodiment further comprises four logic boards made by Gould Electronics Corp. for performing the functions of compression and decompression in interfacing with storage; rotating the data for display purposes; and printer control for the image printer. Also, as illustrated in FIG. 1, a line printer 41 is connected to computer 31, for printing out messages to the operator, particularly for quality control.

Figure 1B:
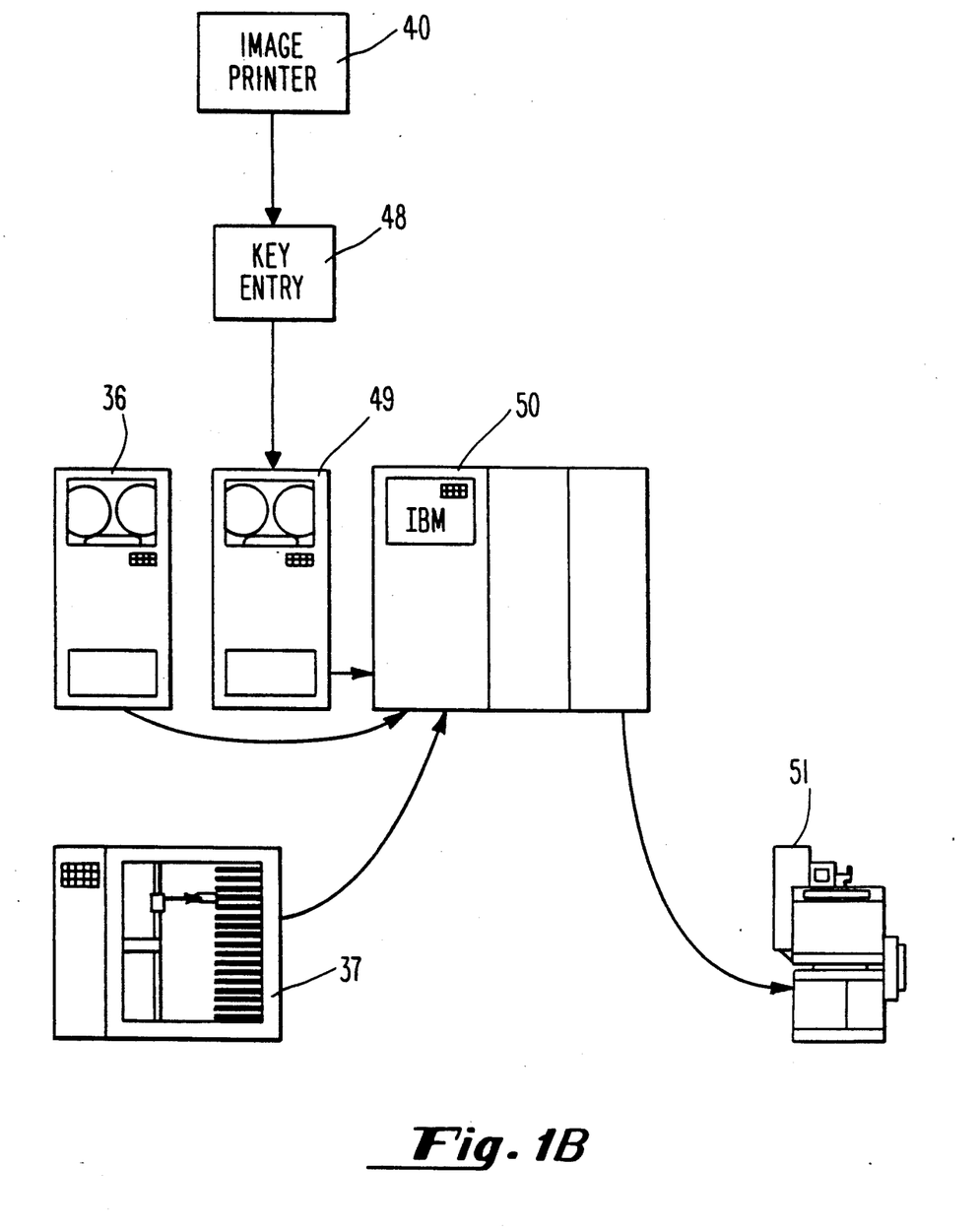
FIG. 1B is a block diagram of a second portion of a preferred embodiment of the invention which illustrates additional computer processing.

Referring now to FIG. 1B, there is shown a schematic diagram of a further portion of the system for producing output documents from the data as stored in the system portion of FIG. 1. The magnetic tape from the computer tape portion 36 is placed into a central computer 50. This tape typically contains what is referred to as check box data, i.e. data that represents whether a box or a designated field has been marked or not. This data has been derived from locations identified from file data, and is in the form of yes/no-type data, ready for subsequent numerical processing. As illustrated, the document from the image printer 40, e.g., images of handwritten numbers, is taken and information therefrom is inputted by an operator at a key entry device illustrated at 48. Typically this data is handwritten character data for which, in a first embodiment, the system has no provision for automatic decoding. Thus an operator takes the key entry data sheet provided by the image printer, and enters the data to be stored on a magnetic tape as shown at unit 49. When this data is compiled, the tape is placed into a tape reader contained within computer system 50. Similarly, an optical disc from disc unit 37 associated with computer 31 is placed into an optical disc read device associated with computer 50. It is to be noted that the optical disc contains data corresponding to each form, which data is used for coordinating the processing of the check box data and key entry data contained on the two magnetic tapes. Thus, the computer system 50 has available to it all of the information data which it needs for subsequent analyzing, as well as form coordinating data derived from the optical discs. Computer 50 provides data processing in accordance with a predetermined program for analyzing the data and producing suitable outputs. In a preferred embodiment as utilized by the assignee of this invention, computer 50 connects data to a printer 51 for producing an output document.

Figure 2:
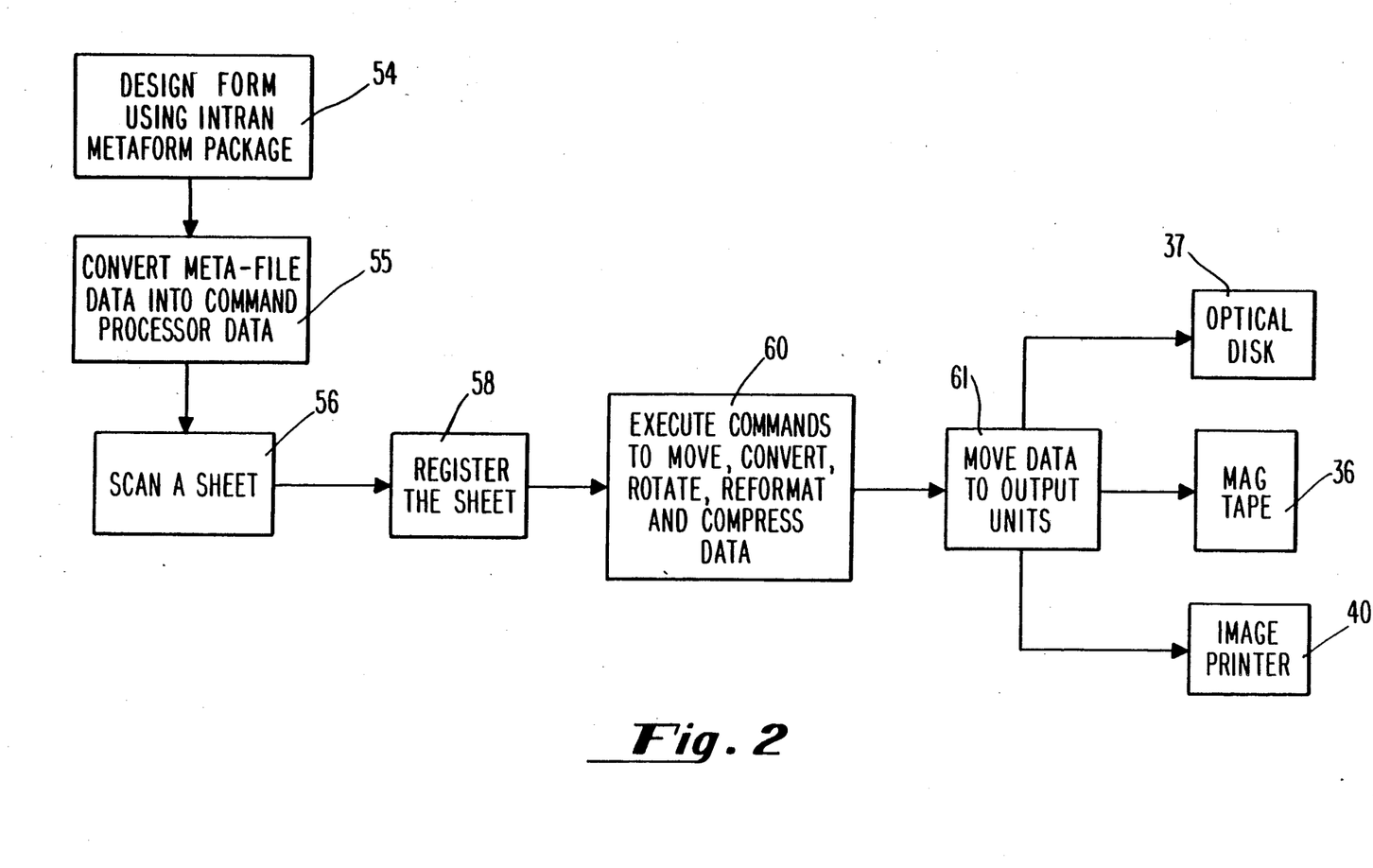
FIG. 2 is a flow diagram illustrating the method of a preferred embodiment of this invention of scanning forms and reducing output documentation, and storing specified scanned data.

Referring now to FIG. 2, there is shown a flow diagram of steps taken to generate the data stored on optical disc and magnetic tape. Initially, well before the filled in forms are processed, the form (such as a Financial Aid Form) is designed as indicated at block 54. In one embodiment, the form is designed using an INTRAN Metaform Professional® package. This is a software package which is generally used in the printing industry to prepare forms for printing. In the practice of this invention, the software package is also utilized to obtain a file which defines the form, as illustrated further in FIGS. 5A and 5B. Following the step of generating the form and obtaining the file data, command processor data is generated corresponding to the file data, as shown at block 55. Thus, for each specified field or location of data contained on the form, one or more commands is generated which are used in processing the data corresponding to that field after it has been scanned from the document. The commands utilized in a preferred embodiment of this invention are illustrated in connection with FIGS. 5B–5D and discussed in more detail hereinbelow. Typical fields represent boxes which may be checked, or larger rectangular areas where printed questions are presented and the person filling out the form has written in answers.

When a form or sheet is scanned, as indicated at 56, the image data is transmitted to the computer, and then the form (or sheet) data is registered as indicated at block 58. The registration step is accomplished by utilizing registration data printed on the form, such as ink means which registration data provides coordinates of the form as seen by the scanner. The computer 31 takes the form registration data, which indicates how the form is positioned relative to the scanner, and operates on the stored field data to transform it to coordinates corresponding to the sheet as actually scanned. After registration, the computer locates the preselected field data and executes commands on the data of each such field, as indicated at 60. These commands include the command to move data to a predetermined output unit, as indicated at block 61. The commands also include commands for recognizing character data and converting it to digital data; converting check box data to numerical data; rotating the data for display purposes; reformatting the data so that it can be presented in a more efficient manner for subsequent processing; and compressing data for more efficient storage, e.g. on optical discs. The data that is moved at block 61 may be moved, as discussed above, either to a magnetic tape 36; an optical disc 37; or the image printer 40. Note that data that is transmitted to the image printer 40 is also stored on the optical disc 37.

Figure 3:
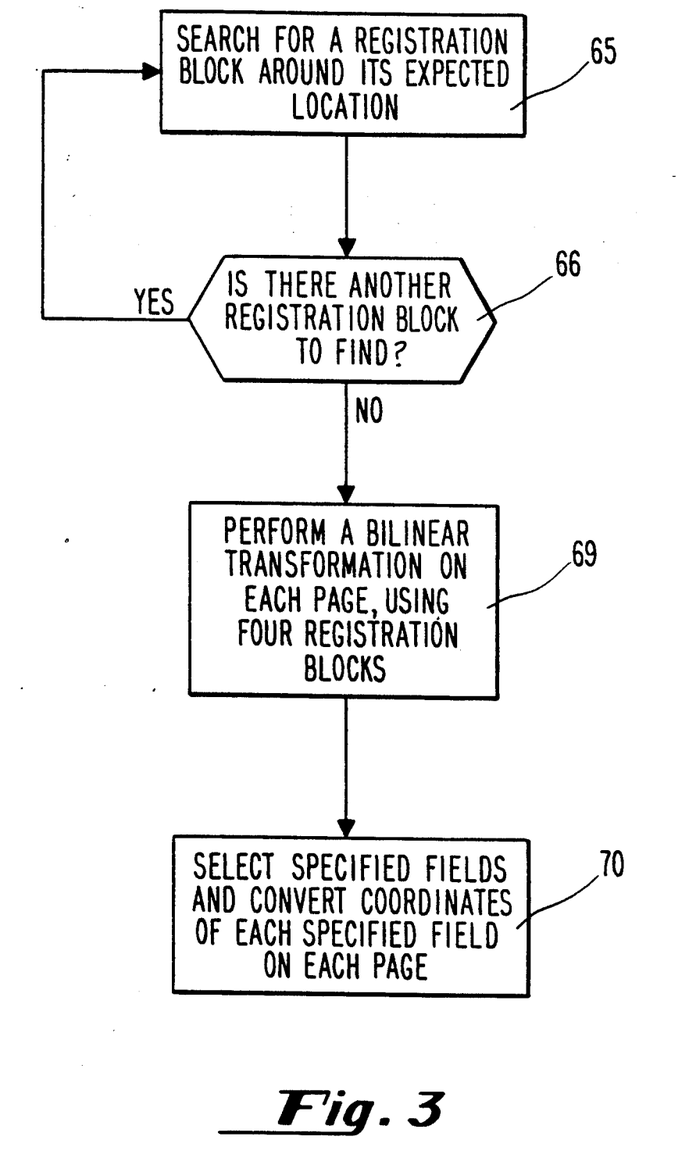
FIG. 3 is flow diagram of a specific portion of the method illustrated in FIG. 2.

Referring now to FIG. 3, there is shown a more detailed flow diagram of the steps taken to register the form, which steps were discussed in connection with block 58 as shown in FIG. 2. As illustrated at block 65, the computer 31 searches for a registration block around its expected location. In a preferred embodiment, each page of a form has four ink means, e.g. registration blocks, typically square, black blocks against a white background, located approximately in the four peripheral corners of the form page. The computer determines the coordinates of the registration block, using conventional image processing techniques. The computer next goes to block 66, where it determines whether there is another registration block to be found, and, if yes, cycles back to block 65. After the four blocks have been found, locating the four coordinates associated therewith, the computer proceeds as illustrated at block 69 to perform a bilinear transformation on each page, using the coordinate information obtained from the four registration blocks. The bilinear transformation is a standard transformation as is practiced in the image processing art. As a result of this information, the stored data corresponding to all of the field coordinates is transformed at block 70, so that the computer knows where those coordinates are to be found in the data representing the scanned form. The computer is then in position to get the data from the specified fields and execute the commands, as indicated in blocks 59 and 60 of FIG. 2.

Referring now to FIG. 4, there is shown a copy of a printed page which represents a collection of images derived from different fields on a typical FAF, and formatted in a predetermined manner. The selected field information is reproduced in true image form, and arranged, or formatted, in a predetermined manner. This form is used by the assignee of this invention, as a key entry form, the data being re-arranged in a predetermined manner to facilitate reading by an operator for purpose of key entering the data onto magnetic tape. This same information is stored on optical disk, so that at any time in the future it can be reproduced, as a security check in determining exactly what information was written down. Thus, if the results of the analysis that is performed on the basis of the information recorded on the form are ever questioned in the future, and there is a request to see the information as recorded, the optical disk may be retrieved and the information printed out in image form. This obviates the need to record and/or keep the entire four pages. Instead, only the selected image information is maintained, which may be reproduced on one sheet, as illustrated. Of course, in general any amount of image information may be selected out and formatted for storage and reproduction, and the invention is not limited to the specific example as presented.

Figure 5A:
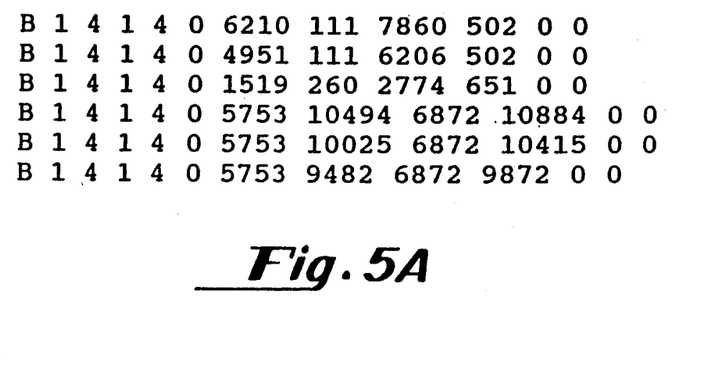
FIG. 5A is an illustration of a portion of a listing of data defining image fields on a form, as utilized in this invention.

Referring now to FIG. 5A, there is shown a representative portion of a printout of data compiled by the INTRAN Metaform Professional ® package. This data defines the regular image fields of one page of an FAF form. These regular image fields are rectangular fields which contain certain printed information and also contain areas where the person filling out the form has written in certain requested information. As indicated, each line of the printed data contains coordinate information corresponding to the upper left and lower right corners of a rectangular field. Thus, the two groups of the digits designated (a) and (b) respectively represent coordinate information for the upper left-hand corner of a rectangle; while the digits identified as (c) and (d) respectively represent the coordinate information of the lower right hand corner.

Figure 5B:
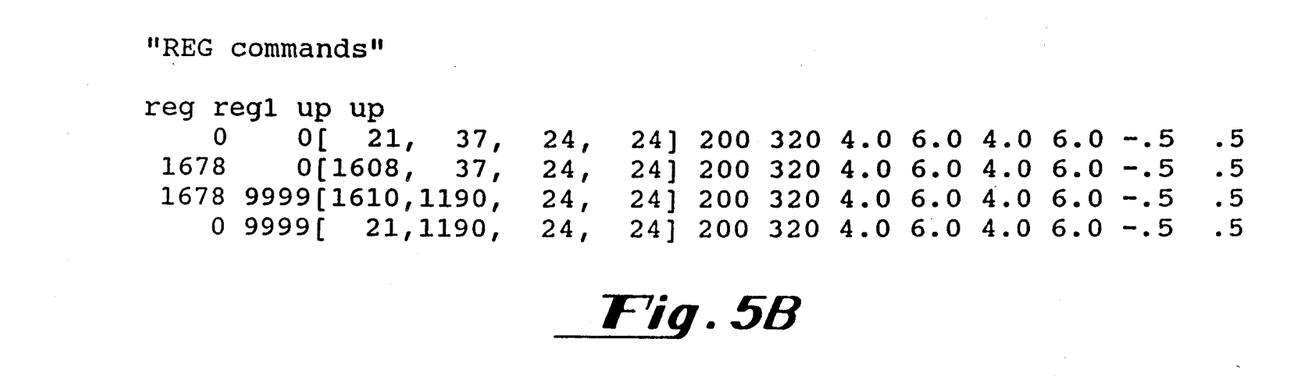
FIG. 5B is an illustration of a listing defining registration blocks as used in the practice of the process of this invention.

Referring now to FIG. 5B, there is shown a printout of registration (REG) commands defining the registration blocks for one of the four pages of a form. The information presented defines the registration block by coordinates, and is used in carrying out the registration sequence as described hereinabove.

Figure 5C:
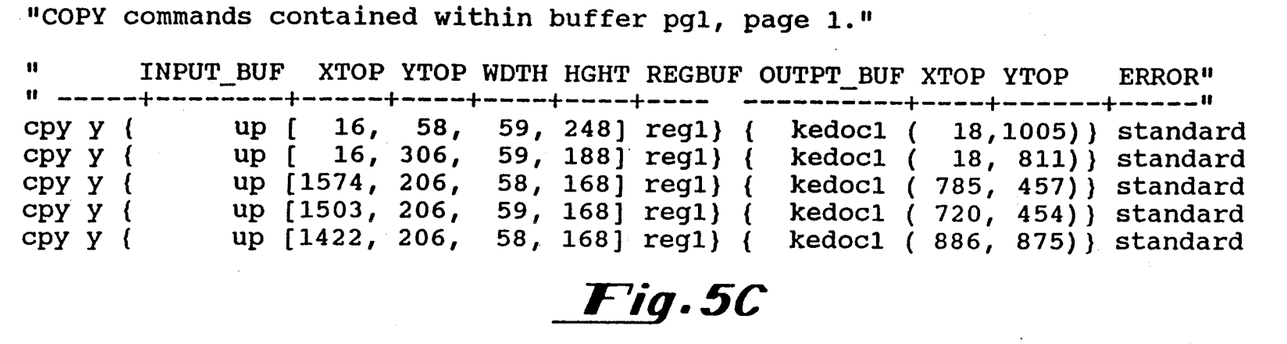
FIG. 5C is an illustration of copy commands as used for specifying the movement of predetermined data which is to be moved into predetermined storage locations.

Referring to FIG. 5C, there is shown a sample of stored COPY commands corresponding to respective fields. The COPY commands command the data from a given field to be taken and placed in a predetermined buffer so that the information for that field is properly formatted. The data illustrated includes input coordinates for each of the respective fields, before registration, as well as coordinates of the output buffer where the data is to be placed. For example, the first "CPY" line calls for copying information found in buffer page 1 at coordinates 16, 58, 59 and 248 into an output buffer defined by coordinates 18, 1005. The output buffers are selected so that storage and printout is in accordance with a predetermined format. This is the basic process of formatting the data so as to produce an output sheet as illustrated by FIG. 4.

Figure 5D:
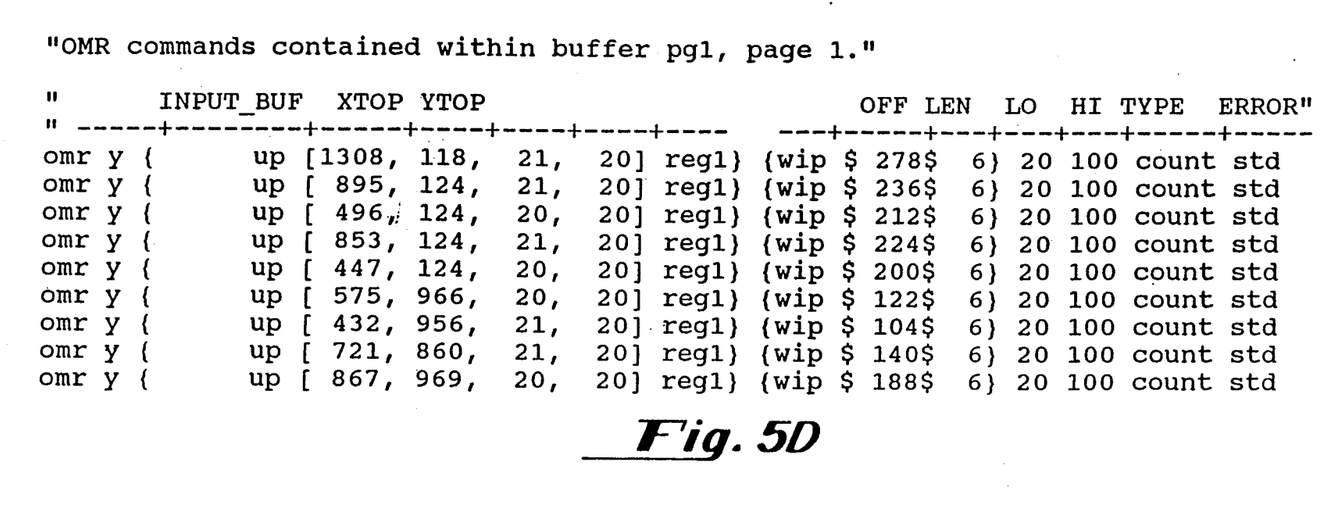
FIG. 5D is an illustration of optical mark recognition commands as used in practicing this invention.

Referring to FIG. 5D, there is illustrated a portion of a listing representing OMR commands which are to be executed. The OMR commands cause the processor to operate on data found at predetermined coordinates and to perform threshold tests (thresholds are designated LO-HIGH) to determine the presence or absence of a check within a check box.

The basic system as described to this point can be supplemented in many ways. For example, if optical character recognition techniques are extended for processing of all data on the form, then the generation of a key entry output page is not required, but rather all of the data can be automatically inputted and processed without operator intervention. However, even in that instance the formatting organizational steps are desired, so as to present the selected information to the processor in proper sequence. Also the formatting is desired in order to record the image data on optical disc, or other suitable media, so as to be able to generate an output page as illustrated in FIG. 4, for security or checking reasons. Further, any amount of the image data can be stored and formatted for generating printed image reproductions along with reports analyzing the data after it has been scanned. Thus, the system can be utilized to produce output reports which combine text which presents analysis of the data recorded on the form, as well as one or more pages which present reproductions of images of the actual fields from the form, formatted in a predetermined manner.

We claim:

1. A method of processing to obtain data from forms and to organize such data, said forms having data in predetermined fields comprising the following steps:
   storing in memory form file data corresponding to a predetermined form, which form data specifies the locations of said predetermined fields within said form;
   generating process commands corresponding to each of said specified fields;
   scanning an executed one of said predetermined forms to obtain scan data representing information on said form and storing said scan data in memory;
   registering each of said specified fields so as to accurately locate the data from such fields in memory;
   processing by carrying out in said computer selected ones of said process commands on the respective specified field data to produce processed field data, wherein said processing step comprises generating a data entry sheet which presents a representation of each of said scanned specified fields arranged in a predetermined format on a sheet; and
   storing said processed field data in at least one storage media.

2. The method as described in claim 1, comprising first designing said form, said designing comprising said file data storing step.

3. The method as described in claim 1, wherein said process command generating step comprises generating copy commands for moving said predetermined field data to predetermined storage media means for storing said data.

4. The method as described in claim 1, wherein said generating step comprises converting said predetermined field data by optical mark recognition.

5. The method as described in claim 1, wherein said generating step comprises rotating said predetermined field data so as to orient said data for proper display.

6. The method as described in claim 1, wherein said generating step comprises recognizing said predetermined field data which is recorded on said form in binary code.

7. The method as described in claim 1, wherein said scanned form comprises a predetermined number of registration marks, and wherein said registering step comprises recognizing registration data representing said registration marks and using said registration data to carry out a transformation of the scanned data of said form, whereby said scanned data is transformed to a form reference so as to enable identification of said predetermined fields within the reference of said form.

8. The method as described in claim 1, wherein said processing step comprises generating a data entry sheet which presents a representation of each of said scanned specified fields arranged in a predetermined format on a sheet.

9. The method as described in claim 1, comprising decoding in a computer predetermined data from selected ones of said specified fields.

10. The method as described in claim 9, comprising inputting data from said data entry sheet to a computer, and processing said inputted data in said computer and producing a report therefrom.

11. The method as described in claim 1, comprising compressing said selected field data, and moving said compressed data to predetermined storage media.

12. A method of processing to obtain data from forms and to organize such data, comprising the following steps:
   storing in memory form file data corresponding to a predetermined form, which form data specifies the locations of said predetermined fields within said form;
   generating process commands corresponding to each of said specified fields;
   scanning an executed one of said predetermined forms to obtain scan data representing information on said form and storing said scan data in memory, said executed form comprising a predetermined number of registration marks comprising a plurality of ink means located at respective corners of said form;
   registering each of said specified fields so as to accurately locate the data from such fields in memory;
   processing by carrying out in said computer selected ones of said process commands on the respective specified field data to produce processed field data; and
   storing said processed field data in at least one storage media.

13. The method as described in claim 1, further comprising generating an image output representing the image of each of said predetermined fields, said images being arranged in a predetermined format.

* * * * *